(12) United States Patent
Iwasaki

(10) Patent No.: US 8,585,122 B2
(45) Date of Patent: Nov. 19, 2013

(54) VEHICLE DOOR LINING

(75) Inventor: Takashi Iwasaki, Gahanna, OH (US)

(73) Assignee: TS TECH Co., Ltd., Saitama (JP)

( * ) Notice: Subject to any disclaimer, the term of this patent is extended or adjusted under 35 U.S.C. 154(b) by 0 days.

(21) Appl. No.: 13/147,819

(22) PCT Filed: Feb. 4, 2009

(86) PCT No.: PCT/US2009/033044
§ 371 (c)(1),
(2), (4) Date: Aug. 4, 2011

(87) PCT Pub. No.: WO2010/090637
PCT Pub. Date: Aug. 12, 2010

(65) Prior Publication Data
US 2011/0291439 A1 Dec. 1, 2011

(51) Int. Cl.
*B60J 5/00* (2006.01)
(52) U.S. Cl.
USPC ........................................ 296/146.7; 296/153
(58) Field of Classification Search
USPC ..................... 296/153, 146.7, 39.1
See application file for complete search history.

(56) References Cited

U.S. PATENT DOCUMENTS

| | | | |
|---|---|---|---|
| 3,926,156 A | 12/1975 | McCormick | |
| 4,453,760 A * | 6/1984 | Hira | 296/37.13 |
| 5,871,253 A | 2/1999 | Erber | |
| RE36,323 E | 10/1999 | Thompson | |
| 6,037,689 A | 3/2000 | Bingle | |
| 6,197,403 B1 | 3/2001 | Brown | |
| 6,712,179 B2 | 3/2004 | Bouyonnet | |
| 7,044,533 B2 * | 5/2006 | Dry et al. | 296/146.5 |
| 7,367,103 B2 | 5/2008 | Schoemann | |
| 7,462,573 B2 * | 12/2008 | Tsujiyama et al. | 442/361 |

FOREIGN PATENT DOCUMENTS

JP 360088642 A * 5/1985 .............. B60N 3/02

* cited by examiner

*Primary Examiner* — Glenn Dayoan
*Assistant Examiner* — Pinel Romain
(74) *Attorney, Agent, or Firm* — Dann, Dorfman, Herrell and Skillman, P.C.

(57) ABSTRACT

There is disclosed a door lining for a vehicle. The vehicle door lining includes a lining body having a step portion, a decorative component to be combined with the lining body, the decorative component including a periphery having a tip surface and an outer surface extending from the tip surface, and at least one stepped cut-out portion provided at the periphery, the decorative component being combined with the lining body with the tip surface being abutted against an inner surface of the lining body and with the outer surface being surface-contacted with the step portion of the lining body, the stepped cut-out portion extending from the tip surface to the outer surface, and at least one noise-preventing member for preventing noise from being generated by rubbing between the lining body and the decorative component which occurs due to vibration of a vehicle body during driving of the vehicle.

16 Claims, 3 Drawing Sheets

FIG. 1
PRIOR ART
FIG. 2
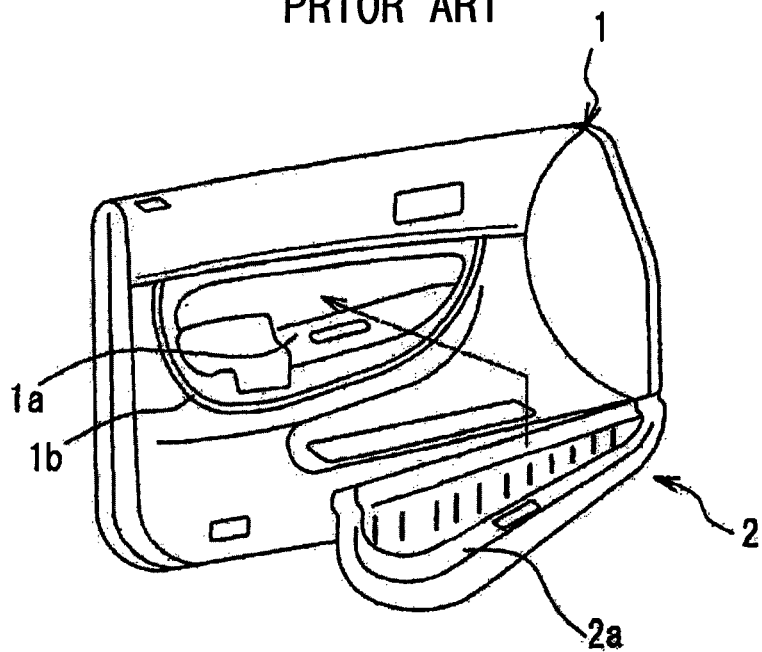
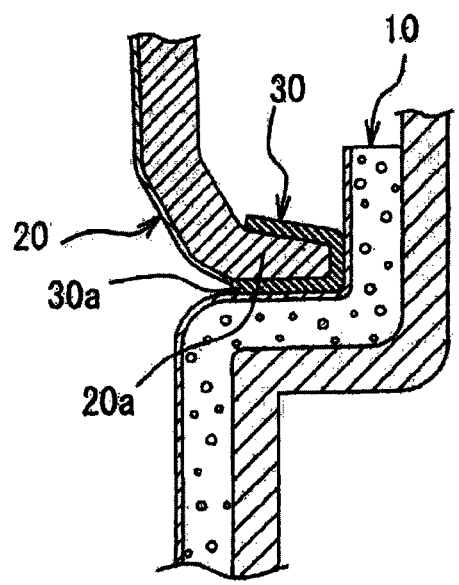

VEHICLE DOOR LINING

BACKGROUND OF THE INVENTION

1. Field of the Invention

The present invention relates to a door lining for a vehicle which includes a lining body and a decorative component combined with the lining body, the decorative component having a noise-preventing member attached or bonded to at least a region of a periphery thereof for preventing noise from being generated by rubbing between the lining body and the decorative component which occurs due to vibration of a vehicle body during driving of the vehicle, the decorative component being attached to the lining body through the noise-preventing member.

2. Description of the Related Art

Referring now to FIG. 1, a vehicle door lining of a related art will be discussed hereinafter in order to facilitate understanding the present invention. This vehicle door lining includes a lining body 1 and a decorative component 2 such as a trim panel for a door arm rest that is combined with the lining body 1 to form the door arm rest. The lining body 1 has a first arm rest forming part 1a and a groove 1b formed in the lining body 1 so as to surround the first arm rest forming part 1a. The trim panel 2 has a second arm rest forming part 2a. The trim panel 2 is fitted at a periphery thereof into the groove 1b of the lining body 1 with the second arm rest forming part 1b covering the first arm rest forming part 1a, whereby the door arm rest is formed. Such a vehicle door lining is disclosed in Japanese Utility Model Application Laid-Open No. Hei. 6-87018.

In the vehicle door lining, there is a possible that noise will be generated by rubbing between the lining body 1 and the trim panel 2 which occurs due to vibration of a vehicle body during driving of a vehicle.

In order to prevent the noise from being generated, it is conceivable that, as shown in FIG. 2, a noise-preventing member 30 is attached or bonded to at least a region of a periphery 20a of a trim panel 20 so as to be wound around the region of the periphery 20a of the trim panel 20 and the trim panel 20 is combined with a lining body 10 with the region of the periphery thereof being abutted against an inner surface of the lining body 10 through the noise-preventing member 30.

However, when the trim panel 20 having the noise-preventing member 30 merely wound around the region of the periphery 20a thereof is combined with the lining body 10, a part 30a of the noise-preventing member 30 is exposed between a general surface of the trim panel 20 and the lining body 10 so as to be visible from the outside, which presents an undesirable visual appearance.

SUMMARY OF THE INVENTION

It is therefore an object of the present invention to provide a vehicle door lining comprising a lining body and a decorative component combined with the lining body, in which a good visual appearance can be presented and noise can be positively prevented from being generated by rubbing between the lining body and the decorative component which occurs due to vibration of a vehicle body during driving of a vehicle.

In accordance with the present invention, there is provided a vehicle door lining comprising a lining body having a step portion, a decorative component to be combined with the lining body, the decorative component including a periphery having a tip surface and an outer surface extending from the tip surface, and at least one stepped cut-out portion extending from the tip surface to the outer surface, the decorative component being combined with the lining body with the tip surface being abutted against an inner surface of the lining body and with the outer surface being surface-contacted with the step portion of the lining body, and at least one noise-preventing member for preventing noise from being generated by rubbing between the lining body and the decorative component which occurs due to vibration of a vehicle body during driving of the vehicle, the at least one noise-preventing member being attached to the periphery of the decorative component in such a manner that it is received in the at least one stepped cut-out portion so as to extend continuously with a general surface of the decorative component and be flush with the general surface of the decorative component, and wound around the region of the periphery of the decorative component, so that the decorative component is combined with the lining body with the tip surface being abutted against the inner surface of the lining body and with the outer surface being surface-contacted with the step portion of the lining body, through the at least one noise-preventing member.

In the vehicle door lining according to the present invention, generation of noise by rubbing between the lining body and the decorative component which occurs due to the vibration of the vehicle body during the driving of the vehicle can be positively prevented by the noise-preventing member. The noise-preventing member is attached to the periphery of the decorative component in such a manner that it is received in the stepped cut-out portion so as to extend continuously from the general surface of the decorative component and be flush with the general surface of the decorative component, and wound around the periphery of the decorative component. Therefore, the noise-preventing member is not visible from the outside between the general surface of the decorative component and the step portion of the lining body with which the periphery of the decorative component is surface-contacted. Moreover, the noise-preventing member is attached to the periphery of the decorative component so as to be received in the stepped cut-out portion, so that the noise-preventing member is hard to be removed from the periphery of the decorative component. In addition, the attaching of the noise-preventing member to the periphery of the decorative component can be performed while causing edges of the noise-preventing member to be positioned with respect to the stepped cut-out portion. Therefore, it is possible to precisely bond the noise-preventing member to the stepped cut-out portion.

The noise-preventing member may be formed of felt or non woven fabric. The stepped cut-out portion may be provided along an entire region of the periphery. In this case, a plurality of the noise-preventing members may be attached to the periphery. Alternatively, the noise-preventing member may be elongated and attached to the periphery so as to extend along the entire region of the periphery. Also, a plurality of the stepped cut-out portions may be provided at regions of the periphery. In this case, a plurality of the noise-preventing members may be attached to the periphery so as to be received in the stepped cut-out portions.

The decorative component may be a trim panel for forming a door arm rest in cooperation with the lining body.

Other objects and many of the attendant advantages of the present invention will be readily appreciated as the same becomes better understood by reference to the following detailed description when considered in connection with the accompanying drawings.

BRIEF DESCRIPTION OF THE DRAWINGS

FIG. 1 is a schematic perspective view showing a vehicle door lining according to a related art, in which a decorative component is separated from a lining body;

FIG. 2 is a schematic sectional view of a vehicle door lining devised by the inventor in order that noise can be prevented from being generated by rubbing between a lining body and a decorative component which occurs due to vibration of a vehicle body during driving of a vehicle;

DETAILED DESCRIPTION OF THE PREFERRED EMBODIMENTS

Figure 3:
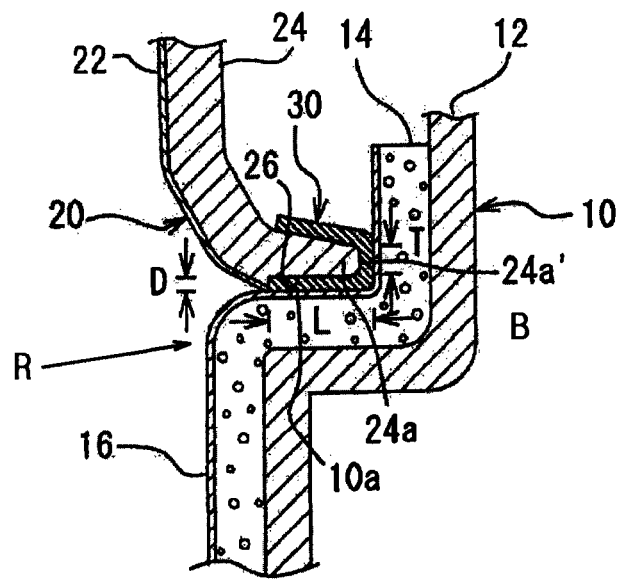
FIG. 3 is a schematic sectional view of a vehicle door lining according to an embodiment of the present invention.

Like the vehicle door lining shown in FIG. 1, a vehicle door lining according to an embodiment of the present invention includes a lining body and a decorative component such as a trim panel for a door arm rest. Incidentally, in FIGS. 3 and 4 which illustrate the embodiment of the present invention, components which are substantially similar to those of the vehicle door lining shown in FIG. 2 are designated by like reference numerals.

Figure 4:
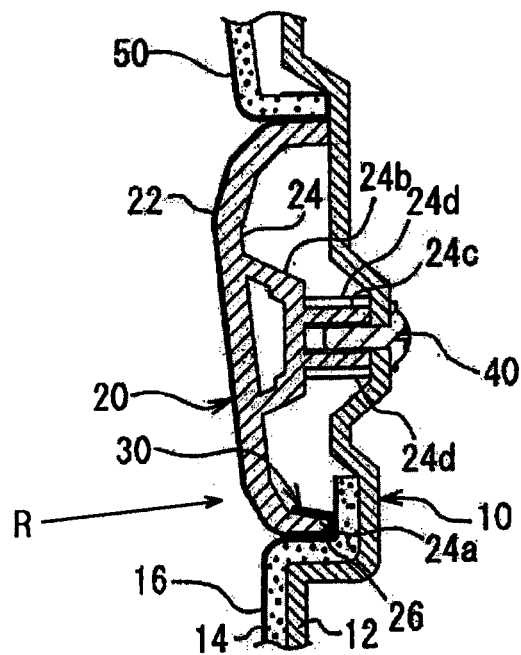
FIG. 4 is a schematic sectional view showing a fixing structure for fixing a decorative component to a lining body of the vehicle door lining shown in FIG. 3.

Referring now to FIGS. 3 and 4, the vehicle door lining according to the embodiment of the present invention will be discussed hereinafter. As shown in FIG. 3, the lining body 10 of the vehicle door lining according to the embodiment of the present invention includes a three-dimensional substrate 12 formed of a synthetic resin material such as a PP (polypropylene) resin, a shock absorbing layer 14 formed of urethane foam or the like on a portion of a surface of the substrate 12, and a sheet 16 of covering material such as polyvinyl chloride (PVC), thermoplastic polyurethane (TPU) or the like laminated on the shock absorbing layer 14. The lining body 10 is to be applied and fixed to a vehicle door panel (not shown).

The trim panel 20 of the door lining according to the embodiment of the present invention includes a pre-formed decorative film 22 and a substrate 24 formed of a synthetic resin such as ABS resin and integrated with the decorative film 22. The substrate 24 is formed integrally with the pre-formed decorative film 22 by a forming mold for forming the trim panel 20. More particularly, the pre-formed decorative film 22 is set in the forming mold and a synthetic resin for the substrate 24 is poured into the forming mold, whereby the trim panel 20 which includes the decorative film 22 and the substrate 24 integrated with the decorative film 22 is formed.

The lining body 10 has a first arm rest forming portion (not shown). The trim panel 20 has a second arm rest forming portion (not shown). The trim panel 20 is combined with the lining body 10 in such a manner that the second arm rest forming portion of the trim panel 20 is aligned and combined with the first arm rest forming portion of the lining body 10, to thereby form the door arm rest R.

The trim panel 20 further includes a noise-preventing member 30 attached or bonded to a region of a periphery 24a of the substrate 24 so as to be wound around the region of the periphery 24a for preventing noise from being generated by rubbing between the combined lining body 10 and trim panel 20 which occurs due to vibration of a vehicle body B of a vehicle during driving of the vehicle provided with the door lining according to the embodiment of the present invention. When the trim panel 20 is combined with the lining body 10, the periphery 24a of the substrate 24 of the trim panel 20 is abutted against an inner surface of the lining body 10 through the noise-preventing member 30 attached or bonded to the region of the periphery 24a of the substrate 24 of the trim panel 20.

When the trim panel 2 is formed by the forming mold, a stepped cut-out portion 26 is formed at the region of the periphery 24a of the substrate 24 at the same time. The stepped cut-out portion 26 is formed so as to extend from a tip surface 24a' of the region of the periphery 24a of the substrate 24 to an area of an outer surface of the region of the periphery 24a which is surface-contacted with a surface of a step portion 10a of the lining body 10 when the trim panel 20 is combined with the lining body 10. The pre-formed decorative film 22 is attached onto an outer surface portion of the substrate 24 except the stepped cut-out portion 26 of the substrate 24.

The stepped cut-out portion 26 is formed so as to have a depth substantially corresponding to a thickness of the noise-preventing member 30. The noise-preventing member 30 is received in the stepped cut-out portion 26 so as to extend continuously from an edge of the pre-formed decorative film 22 and be flush with a surface of the pre-formed decorative film 22, and attached or bonded to the region of the periphery 24a of the substrate 24 so as to be wound around the region of the periphery 24a. Thus, the noise-preventing member 30 is attached or bonded to the substrate 24 of the trim panel 20 so as to be flush with a general surface of the trim panel 20.

The noise-preventing member 30 is formed of felt, non woven fabric, or the like. When the noise-preventing member 30 having a thickness of, for example, 0.5 mm is employed, the depth D of the stepped cut-out portion 26 may be set to about 0.5 mm, a thickness T of the tip surface 24a' of the periphery 24a of the substrate 24 may be set to about 2 mm, and a length L of a region of the stepped cut-out portion 26 which extends from the tip surface 24a' of the periphery 24a of the substrate 24 may be set to about 5 mm.

As discussed above, the noise-preventing member 30 is attached or bonded to the region of the periphery 24a of the substrate 24 in such a manner that it is received in the stepped cut-out portion 26 so as to extend continuously from the edge of the decorative film 22 and be flush with the surface of the decorative film 22, and wound around the periphery 24a of the substrate 24. Therefore, the noise-preventing member 30 is not visible from the outside between the general surface of the trim panel 20 and the surface of the step portion 10a of the lining body 10 with which the periphery 24a of the substrate 24 is surface-contacted. Moreover, the noise-preventing member 30 is attached or bonded to the region of the periphery 24a of the substrate 24 so as to be received in the stepped cut-out portion 26, so that the noise-preventing member 30 is hard to be removed from the substrate 24. In addition, the attaching of the noise-preventing member 30 to the region of the periphery 24a of the substrate 24 can be performed while causing edges of the noise-preventing member 30 to be positioned with respect to the stepped cut-out portion 26. Therefore, it is possible to precisely bond the noise-preventing member 30 to the stepped cut-out portion 26.

As shown in FIG. 4, the substrate 24 of the trim panel 20 has a base portion 24b provided on an inner surface thereof, a screw receiving post 24c protruding from the base portion 24b, and two or four spaced apart reinforcing-ribs 24d provided around the screw receiving post 24c and extending along an axial direction of the screw receiving post 24c. The base portion 24b is formed in a bridge shape which allows the base portion 24b to be broken when subjected to impact. The trim panel 20 is fixed to the lining body 10 by causing the periphery 24a of the substrate 24 to be abutted against the inner surface of the lining body 10 through the noise-preventing member 30 and causing a tapping screw 40 to be threaded into the screw receiving post 24c from an outer side of the lining body 10.

Figure 5:
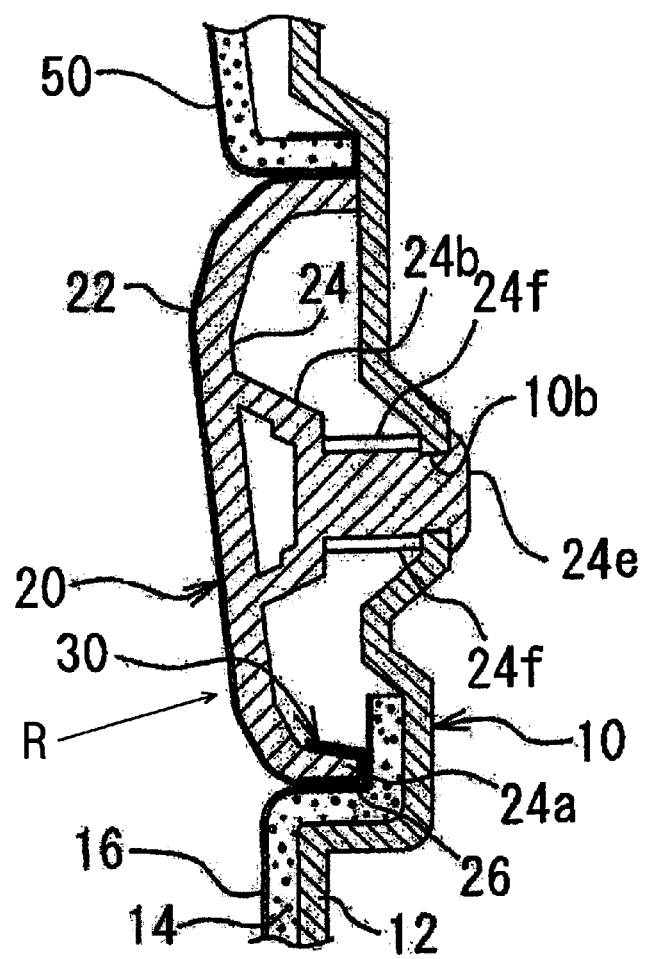
FIG. 5 is a schematic sectional view showing a modification of the fixing structure shown in FIG. 4.

Referring now to FIG. 5, there is illustrated a modification of the fixing structure of FIG. 4 for fixing the trim panel 20 to the lining body 10. The modification is substantially similar to the fixing structure of FIG. 4 except that a riveting stem 24e is employed in lieu of the screw receiving post 24c and the tapping screw 40 is not used. In FIG. 5, components which are substantially similar to those shown in FIG. 4 are denoted with like reference numerals. The riveting stem 24e protrudes from the base portion 24b of the substrate 24. Two or four spaced apart reinforcing-ribs 24f are provided around the riveting stem 24e so as to extend along an axial direction of the riveting stem 24e. According to this modification, the trim panel 20 is fixedly attached to the lining body 10 by causing the periphery 24a of the substrate 24 to be abutted against the inner surface of the substrate 12 of the lining body 10 through the noise-preventing member 30, causing the riveting stem 24e to be inserted through a through-hole 10b formed in the substrate 12 of the lining body 10, and causing a head of the riveting stem 24e to be riveted over an outer surface of the substrate 12 of the lining body 10.

In FIGS. 4 and 5, reference numeral 50 denotes an upper cover which is combined with the lining body 10. A region of the periphery of the substrate 24 of the trim panel 20 which is contacted with the upper cover 50 may be also provided with a noise-preventing member.

In the vehicle door lining structured as discussed above, the trim panel 20 is fixedly attached to the lining body 10 in such a manner that the periphery 24a of the substrate 24 of the trim panel 20 which is provided with the noise-preventing member 30 is abutted against the inner surface of the substrate 12 of the lining body 10 through the noise-preventing member 30. Therefore, noise can be positively prevented from being generated by rubbing between the trim panel 20 and the lining body 10 which occurs due to the vibration of the vehicle body during driving of the vehicle. In addition, the noise-preventing member 30 is attached or bonded to the periphery 24a of the substrate 24 of the trim panel 20 in such a manner that it is received in the stepped cut-out portion 26 of the periphery 24a of the substrate 24 so as to extend continuously from the edge of the decorative film 22 and be flush with the surface of the decorative film 22, and wound around the periphery 24a of the substrate 24. Therefore, the noise-preventing member 30 is not visible from the outside between the general surface of the trim panel 20 and the surface of the step portion 10a of the lining body 10 with which the periphery 24a of the substrate 24 of the trim panel 20 is surface-contacted. Thus, according to the present invention, there is provided the vehicle door lining having a good visual appearance.

While the case where the stepped cut-out portion 26 is formed at the region of the periphery 24a of the substrate 24 has been discussed above, a plurality of stepped cut-out portions 26 (only one of the stepped cut-out portions 26 is shown in FIGS. 3 to 5, for example) may be formed at regions of the periphery 24a of the substrate 24 or the stepped cut-out portion 26 may be formed along an entire region of the periphery 24a of the substrate 24. In this case, a plurality of noise-preventing members 30 (only one of the noise-preventing members 30 is shown in FIGS. 3 to 5, for example) may be attached or bonded to the regions of the periphery 24a of the substrate 24 in the same manner as discussed above, or an elongated noise-preventing member may be attached or bonded to the entire periphery 24a of the substrate 24 in the same manner as discussed above. Moreover, while the case where the trim panel for the arm rest is employed as the decorative component has been discussed above, a decorative component such as a center pad may be employed as the decorative component.

The terms and expressions which have been employed herein are used as terms of description and not of limitation. There is no intention in the use of such terms and expressions to exclude any equivalents of the features shown and described, or any portion thereof. It is recognized, however, that various modifications are possible within the scope of the invention claimed.

What is claimed is:

1. A door lining for a vehicle comprising:
a lining body having a step portion;
a decorative component to be combined with said lining body;
said decorative component including a periphery having a tip surface and an outer surface extending from said tip surface, and at least one stepped cut-out portion extending from said tip surface to said outer surface;
said decorative component being combined with said lining body with said tip surface being abutted against an inner surface of said lining body and with said outer surface being surface-contacted with said step portion of said lining body; and
at least one noise-preventing member for preventing noise from being generated by rubbing between said lining body and said decorative component which occurs due to vibration of a vehicle body during driving of said vehicle;
said at least one noise-preventing member being attached to said periphery of said decorative component in such a manner that it is received in said at least one stepped cut-out portion so as to extend continuously from a general surface of said decorative component and be flush with said general surface of said decorative component, and wound around said periphery of said decorative component, so that said decorative component is combined with said lining body with said tip surface thereof being abutted against said inner surface of said lining body and with said outer surface thereof being surface-contacted with said step portion of said lining body, through said at least one noise-preventing member.

2. A door lining according to claim 1, wherein said at least one noise-preventing member is formed of felt or non woven fabric.

3. A door lining according to claim 1, wherein said stepped cut-out portion is formed along an entire region of said periphery and a plurality of said noise-preventing members are attached to said entire region of said periphery.

4. A door lining according to claim 2, wherein said stepped cut-out portion is formed along an entire region of said periphery and a plurality of said noise-preventing members are attached to said entire region of said periphery.

5. A door lining according to claim 1, wherein said stepped cut-out portion is formed along an entire region of said periphery and said at least one noise-preventing member is elongated and attached along said entire region of said stepped cut-out portion.

6. A door lining according to claim 2, wherein said stepped cut-out portion is formed along an entire region of said periphery and said at least one noise-preventing member is elongated and attached along said entire region of said stepped cut-out portion.

7. A door lining according to claim 1, wherein a plurality of said stepped cut-out portions are formed at regions of said periphery and a plurality of said noise-preventing members are attached to said periphery so as to be received in said stepped cut-out portions.

8. A door lining according to claim 2, wherein a plurality of said stepped cut-out portions are formed at regions of said periphery and a plurality of noise-preventing members are attached to said periphery so as to be received in said stepped cut-out portions.

9. A door lining according to claim 1, wherein said decorative component is a trim panel for forming a door arm rest in cooperation with said lining body.

10. A door lining according to claim 2, wherein said decorative component is a trim panel for forming a door arm rest in cooperation with said lining body.

11. A door lining according to claim 3, wherein said decorative component is a trim panel for forming a door arm rest in cooperation with said lining body.

12. A door lining according to claim 4, wherein said decorative component is a trim panel for forming a door arm rest in cooperation with said lining body.

13. A door lining according to claim 5, wherein said decorative component is a trim panel for forming a door arm rest in cooperation with said lining body.

14. A door lining according to claim 6, wherein said decorative component is a trim panel for forming a door arm rest in cooperation with said lining body.

15. A door lining according to claim 7, wherein said decorative component is a trim panel for forming a door arm rest in cooperation with said lining body.

16. A door lining according to claim 8, wherein said decorative component is a trim panel for forming a door arm rest in cooperation with said lining body.

\* \* \* \* \*